Dec. 19, 1950 P. BLAIN 2,534,849
DEVICE FOR THE CONTINUOUS MEASURING OF
THE THICKNESS OF A BAND IN THE ROLLING
Filed Aug. 9, 1946
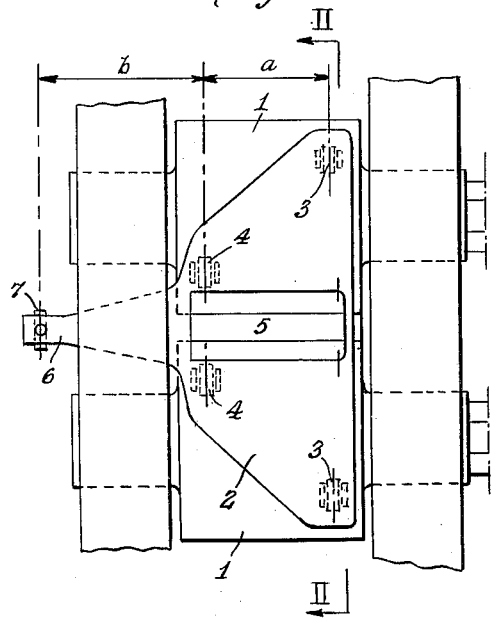
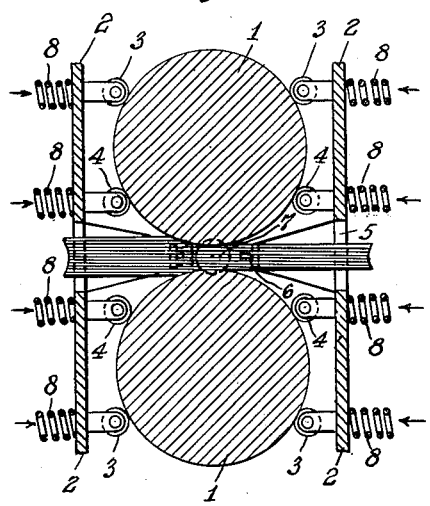
INVENTOR.
PAUL BLAIN
BY Robert E. Burns
ATTORNEY Patented Dec. 19, 1950

2,534,849

UNITED STATES PATENT OFFICE 2,534,849

DEVICE FOR THE CONTINUOUS MEASURING OF THE THICKNESS OF A BAND IN THE ROLLING

Paul Blain, Paris, France, assignor to Societe Anonyme des Acieries et Forges de Firminy, Paris, France, a body corporate of France Application August 9, 1946, Serial No. 689,363
In France January 29, 1946

1 Claim. (Cl. 33—147)

There are in existence many appliances designed for the continuous measuring of bands while being rolled. Such appliances consist of feeler rollers, placed at a given distance from the exit of the rolls, opposite each other, above and below the band and urged against each other. The appliance shows the gap between the feeler rollers by the help of a mechanical or electric device and thus is got a continuous measure of the thickness of the band being rolled.

These appliances have certain disadvantages. There is a danger that the feeler rollers do not record exactly the thickness of the band if said band or strip is not quite even, in which case the line joining the axes of the rollers may not be quite perpendicular to the tangent to the band at its point of contact. The rollers are delicate parts and can be damaged by the band especially if it breaks. Finally, as the measuring is not done at the exact spot where the band leaves the rolls, the reading that is given by the continuous measuring apparatus is so much later, in contrast to what would be got if the thickness of the band was measured as its point of reduction in thickness by the rolls. This latter weak point is especially awkward if the intention is to make use of the readings of the measuring apparatus to act on the device for closing the rolls in order to keep a constant thickness of the band.

The device for continuous measuring of the thickness of the band, that is the object of my invention, does not have these disadvantages. In this case, it is the rolls themselves that play the part of the feeler rollers of the devices known already. The actual distance between the rolls is measured and this with a trifling correction is the thickness of the rolled band; the measurement of the distance between the rolls is done by the help of frames furnished with feeler rollers running on the surface of the rolls. These frames are adjusted in such a way that the variations in diameter of the rolls, resulting from changes of temperature, do not affect the measuring.

With this device the thickness of the band is measured at the very spot where it is reduced in thickness by the rolls. The feeler rollers bear on the surface of the rolls that is much more even than that of the rolled band. Finally the equipment is not in contact with the band and, therefore, cannot be damaged by it.

Figs. 1 and 2 show, as an example, without being tied down to any limitation, a possible form of the device that is the object of my invention.

Fig. 1 illustrates in elevation the roll stand.

Fig. 2 shows a section of the same stand on line II—II.

I denotes the rolls. On each side of these are frames 2 drawn towards each other by the action of springs 8 and bearing on the surface of the rolls by two sets of two feeler rollers 3 and 4 shifted with reference to one another longitudinally and tranversely of the rolls.

These frames 2 have an opening 5 through which the band to be rolled passes. They are furnished with a tail shank 6 that comes out of the roll stand through the iron castings or chocks. Between the ends of the tail shanks 6 of the two frames opposite each other is set a dial measuring apparatus 7.

The working of the device is as follows:

If the thickness of the band increases, the rolls open; the feeler rollers 3 move away from the general symmetry of the rolls, while the feeler rollers 4 draw closer. The frames 2 rock slightly and the tail shanks 6 come nearer to each other. In the opposite way, if the thickness of the band decreases, the rolls come closer and the frames 2 rock slightly so that their tail shanks draw apart. The variations in distance of the tail shanks are practically in proportion to the differences of spacing between the rolls, and the indicator dial 7 therefore records the thickness of the band. With a suitable definition of the distance of the axes of the rollers 3 and of those of the rollers 4 as well as the distance $a$ between the sets of rollers 3 and 4, and the distance $b$ of the rollers 4 to the axis of the measuring apparatus 7, it is possible to ensure that the reading given by the dial may be independent of the slight differences in diameter that the rolls undergo while in operation due to their changes in temperature. In order to get this result, the rollers 3 and 4 must bear on the part of the surface that rolls the band, and that therefore undergoes the changes of temperature in question.

In the example illustrated, a measuring dial apparatus is placed between the tail-shanks 6 of the frames with the feeler rollers. It is equally possible to measure the variations of the distance between these shanks by the help of an electric apparatus or again to furnish them with parts that give an electric contact when the thickness of the band exceeds a given value and opens the contact when the thickness falls below the same value: this switching can actuate, either a light or sound signal, or the adjusting mechanism of the roll stand with the object of keeping the thickness constant.

What I claim as my invention and desire to secure by Letters Patent is:

In a rolling mill provided with a pair of rolls having their axes in parallel relationship and adapted to roll a metal band, a device for the continuous measuring of the thickness of the band during the rolling thereof, comprising a first frame positioned at the inlet side, a second frame positioned at the outlet side, a set of four rollers mounted on each of said frames, two rollers of each set being mounted within the space comprised between the horizontal planes passing through said axes while the remaining two rollers of the same set are mounted externally of said space, spring means for urging said frames against said rolls, each of said frames bearing against both rolls through engagement of one pair of rollers on one roll and the other pair of rollers on the other roll, and means for measuring the relative displacement between two given points, one on each frame, said relative displacement indicating the variations occurring in the distance between said rolls.

PAUL BLAIN.

REFERENCES CITED

The following references are of record in the file of this patent:

UNITED STATES PATENTS

| Number | Name | Date |
|---|---|---|
| 537,016 | Cameron | Apr. 9, 1895 |
| 1,098,760 | Reed | June 2, 1914 |
| 1,507,930 | McDonough | Sept. 9, 1924 |
| 1,687,192 | Barber | Oct. 9, 1928 |
| 2,032,584 | Lengel et al. | Mar. 3, 1936 |
| 2,303,681 | Buccicone | Dec. 1, 1942 |
| 2,366,508 | Fors | Jan. 2, 1945 |